(12) United States Patent
Sakurai et al.

(10) Patent No.: US 7,495,820 B2
(45) Date of Patent: Feb. 24, 2009

(54) INFORMATION DISPLAY DEVICE

(75) Inventors: Ryo Sakurai, Kokubunji (JP); Takanori Shoji, Higashimurayama (JP); Taichi Kobayashi, Kodaira (JP); Hidetoshi Hiraoka, Nishitokyo (JP)

(73) Assignee: Bridgestone Corporation, Tokyo (JP)

( * ) Notice: Subject to any disclaimer, the term of this patent is extended or adjusted under 35 U.S.C. 154(b) by 7 days.

(21) Appl. No.: 10/587,936

(22) PCT Filed: Feb. 3, 2005

(86) PCT No.: PCT/JP2005/001604

§ 371 (c)(1),
(2), (4) Date: Aug. 2, 2006

(87) PCT Pub. No.: WO2005/076064

PCT Pub. Date: Aug. 18, 2005

(65) Prior Publication Data

US 2007/0164984 A1    Jul. 19, 2007

(30) Foreign Application Priority Data

Feb. 4, 2004   (JP) ............... 2004-027596

(51) Int. Cl.
*G02B 26/00* (2006.01)
(52) U.S. Cl. .................. 359/296; 359/290
(58) Field of Classification Search .......... 359/290, 359/296, 297, 238, 240, 243; 204/485; 430/28, 430/29, 32
See application file for complete search history.

(56) References Cited

U.S. PATENT DOCUMENTS

| 2002/0195928 A1 | 12/2002 | Grace et al. |
| 2005/0001810 A1* | 1/2005 | Yakushiji et al. ............ 345/107 |
| 2005/0052402 A1 | 3/2005 | Kitano et al. |

FOREIGN PATENT DOCUMENTS

| EP | 1 429 178 A1 | 6/2004 |
| JP | 4-337208 A | 11/1992 |
| JP | 2001-307871 A | 11/2001 |
| JP | 2003-255402 A | 9/2003 |
| JP | 2003-322883 A | 11/2003 |
| JP | 2007-78850 A | 3/2007 |
| WO | 00/38001 A1 | 6/2000 |
| WO | 03/027764 A1 | 3/2003 |
| WO | 03/044596 A1 | 5/2003 |

* cited by examiner

*Primary Examiner*—Timothy J Thompson
(74) *Attorney, Agent, or Firm*—Sughrue Mion, PLLC

(57) ABSTRACT

An information display device has an information display plate where at least one or more kinds of particles are sealed between cells formed by a partition wall, the cells being between two opposite substrates at least either of which is transparent. At least either of electrodes is provided on a substrate, and an electric field is applied to the particles by the electrodes to move the particles, causing information such as an image to be displayed on the display plate. The surfaces of the substrates are smoothed by making $D \geq 2H$ satisfied, with D being the diameter of a particle (a particle forming the particles), H the height of the electrodes. This thins the electrodes as much as possible (making the height of the electrodes small) and smoothes the surfaces of the substrates, and as a result, the information display device after an endurance test has an improved contrast ratio.

4 Claims, 9 Drawing Sheets

Circuits are formed on dummy substrate → Substrate material lamination → Dummy substrate peeling (completion)

INFORMATION DISPLAY DEVICE

BACKGROUND OF THE INVENTION

1. Field of the Invention

The present invention relates to an information display device comprising an information display panel enables to repeatedly display information such as an image accompanied by flight and movement of particles utilizing Coulomb's force and so on, and particularly relates to an information display device in which a contrast ratio after endurance can be improved.

2. Description of Related Art

As an information display device substitutable for liquid crystal display (LCD), information display devices with the use of technology such as an electro-phoresis method, an electro-chromic method, a thermal method, dichroic-particles-rotary method are proposed.

As for these information display devices, it is conceivable as inexpensive visual display device of the next generation from a merit having wide field of vision close to normal printed matter, having smaller consumption with LCD, or having a memory function, and spreading out to a display for portable device and an electronic paper is expected. Recently, electrophoresis method is proposed that microencapsulate dispersion liquid made up with dispersion particles and coloration solution and dispose the liquid between faced substrates, and also it is expected.

However, in the electrophoresis method, there is a problem that a response rate is slow by the reason of viscosity resistance because the particles migrate among the electrophoresis solution. Further, there is a problem of lacking imaging repetition stability, because particles with high specific gravity of titanium oxide is scattered within solution of low specific gravity, it is easy to subside, difficult to maintain a stability of dispersion state. Even in the case of microencapsulating, cell size is diminished to a microcapsule level in order to make it hard to appear, however, an essential problem was not overcome at all.

Besides the electrophoresis method using behavior in the solution, recently, a method wherein electro-conductive particles and a charge transport layer are installed in a part of the substrate without using solution is proposed. [The Imaging Society of Japan "Japan Hardcopy '99" (Jul. 21-23, 1999) Transaction Pages 249-252] However, the structure becomes complicated because the charge transport layer and further a charge generation layer are to be arranged. In addition, it is difficult to constantly dissipate charges from the electro-conductive particles, and thus there is a drawback on the lack of stability.

As one method for overcoming the various problems mentioned above, an information display device comprising an information display panel is known, in which at least one group of particles are sealed in a plurality of cells formed by partition walls between the opposed substrates, at least one of two substrates being transparent, and, in which the particles, to which an electrostatic field is applied by utilizing electrodes arranged to the substrates respectively, are made to move so as to display information such as an image.

In the information display device mentioned above, for example, a transparent conductive material such as ITO formed on a surface of the substrate such as glass substrate is patterned to be a line shape for example so as to form an electrode, and then partition walls are formed thereon by means of a photo-resist method to make a plurality of cells, in which at least one group of the particles are sealed. In this cases, since a gap like a valley is formed between adjacent electrodes on the substrate, in the case such that a particle diameter D of the particles is small with respect to a height H of the electrode (height between a surface of the substrate and an upper surface of the electrode), the particles spilled from a gap between opposed electrodes are caught in the gap between the electrodes and do not move, and thus a display defect sometimes occurs. This problem occurs in the same manner for the information display device comprising the information display panel, in which at least one group of particles are sealed in a plurality of cells formed by partition walls between the opposed substrates, at least one of two substrates being transparent, and, in which the particles, to which an electrostatic field is applied by utilizing electrodes arranged to the substrates respectively, are made to move so as to display information such as an image.

SUMMARY OF THE INVENTION

An object of the present invention is to eliminate the drawbacks mentioned above and to provide an information display device in which a contrast ratio after endurance is improved by making a thickness of the electrode as thin as possible (making a height of the electrode smaller) and by making a surface of the substrate smooth.

According to the first invention, an information display device which comprises an information display panel, in which at least one group of particles are sealed in a plurality of cells formed by partition walls between the opposed substrates, at least one of two substrates being transparent, and, in which the particles, to which an electrostatic field is applied by utilizing electrodes arranged to the substrates respectively, are made to move so as to display information such as an image, is characterized in that, when D is assumed to be a particle diameter of the particles and H is assumed to be a height of the substrate, the following relation is satisfied: $D \geq 2H$.

According to the second invention, an information display device which comprises an information display panel, in which at least one group of particles are sealed in a plurality of cells formed by partition walls between the opposed substrates, at least one of two substrates being transparent, and, in which the particles, to which an electrostatic field is applied by utilizing electrodes arranged to the substrates respectively, are made to move so as to display information such as an image, is characterized in that, when D is assumed to be a particle diameter of the particles and H is assumed to be a height of the substrate, the following relation is satisfied: $D \geq 2H$, and, that a metal foil is laminated to a surface of the substrate opposed to a surface to which the electrode is arranged.

According to the third invention, an information display device which comprises an information display panel, in which at least one group of liquid powders composed of a solid material stably floating as a dispersant in a gas and exhibiting a high fluidity in an aerosol state are sealed in a plurality of cells formed by partition walls between the opposed substrates, at least one of two substrates being transparent, and, in which the particles, to which an electrostatic field is applied by utilizing electrodes arranged to the substrates respectively, are made to move so as to display information such as an image, is characterized in that, when D is assumed to be a particle diameter of particle materials constituting the liquid powders and H is assumed to be a height of the substrate, the following relation is satisfied: $D \geq 2H$.

According to the fourth invention, an information display device which comprises an information display panel, in which at least one group of liquid powders composed of a solid material stably floating as a dispersant in a gas and exhibiting a high fluidity in an aerosol state are sealed in a plurality of cells formed by partition walls between the opposed substrates, at least one of two substrates being transparent, and, in which the particles, to which an electrostatic field is applied by utilizing electrodes arranged to the substrates respectively, are made to move so as to display information such as an image, is characterized in that, when D is assumed to be a particle diameter of particle materials constituting the liquid powders and H is assumed to be a height of the substrate, the following relation is satisfied: $D \geq 2H$, and, that a metal foil is laminated to a surface of the substrate opposed to a surface to which the electrode is arranged.

DESCRIPTION OF THE PREFERRED EMBODIMENTS

Hereinafter, the best mode for carrying out the invention will be explained in detail on the basis of the figures.

Figure 1:
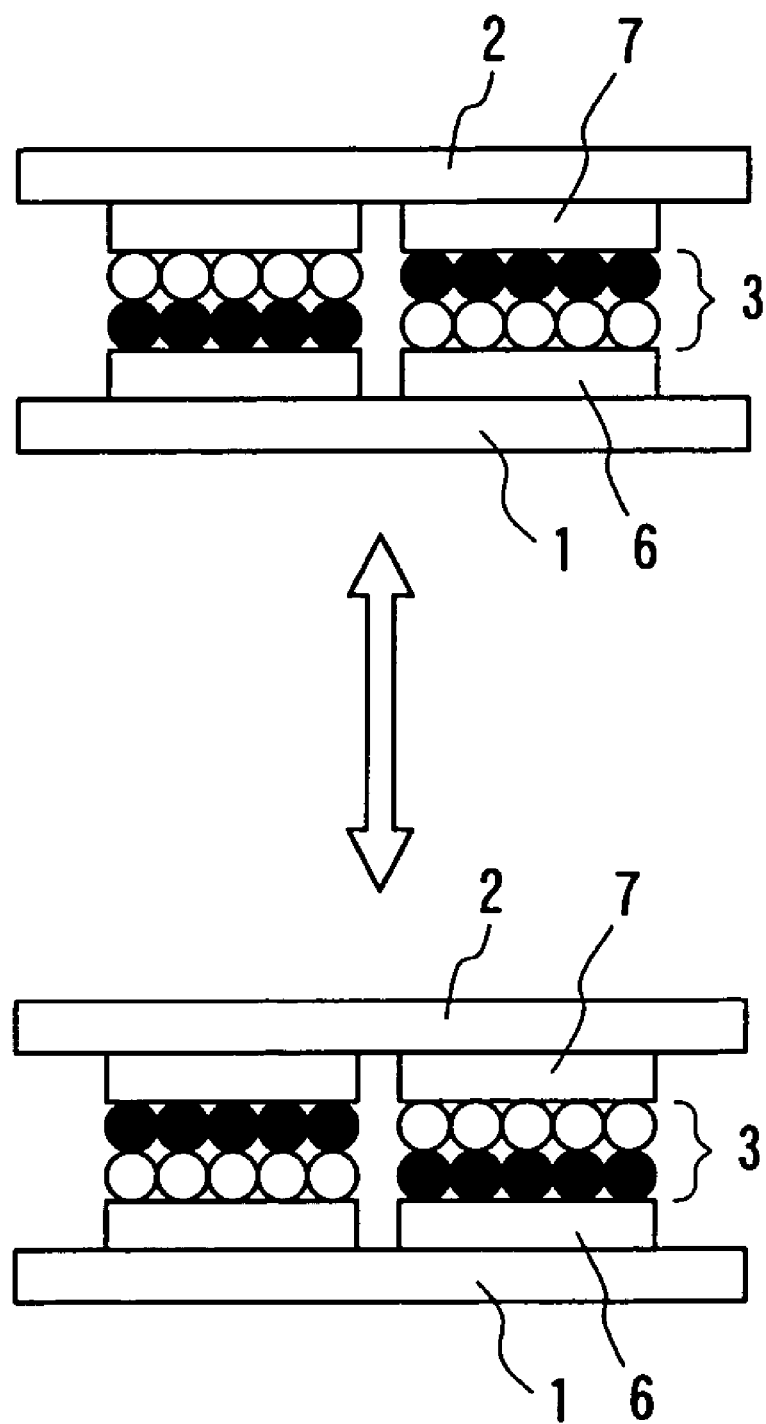
FIG. 1 is a schematic view showing one embodiment of an information display panel constituting an information display device according to a first aspect of the invention.
Figure 2:
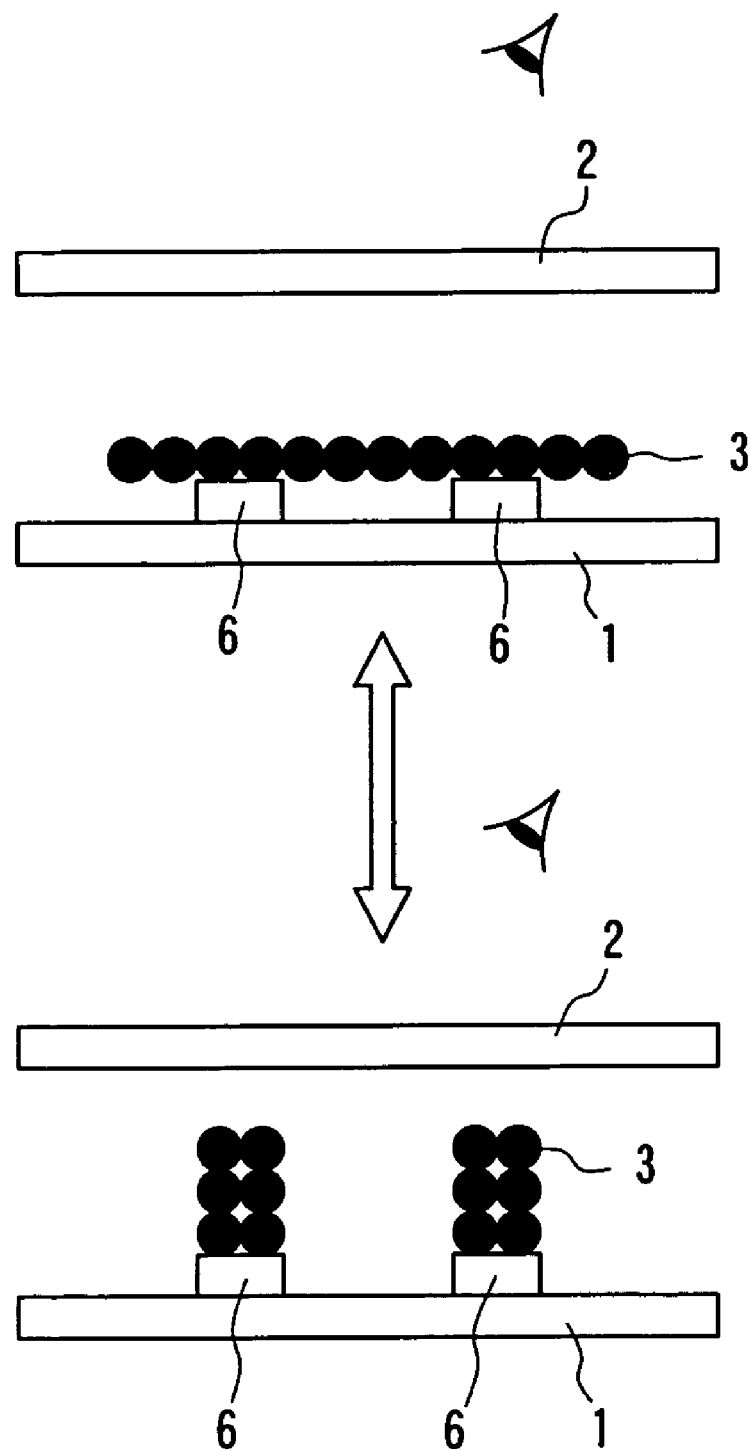
FIG. 2 is a schematic view illustrating another embodiment of an information display panel constituting an information display device according to a first aspect of the invention.
Figure 3:
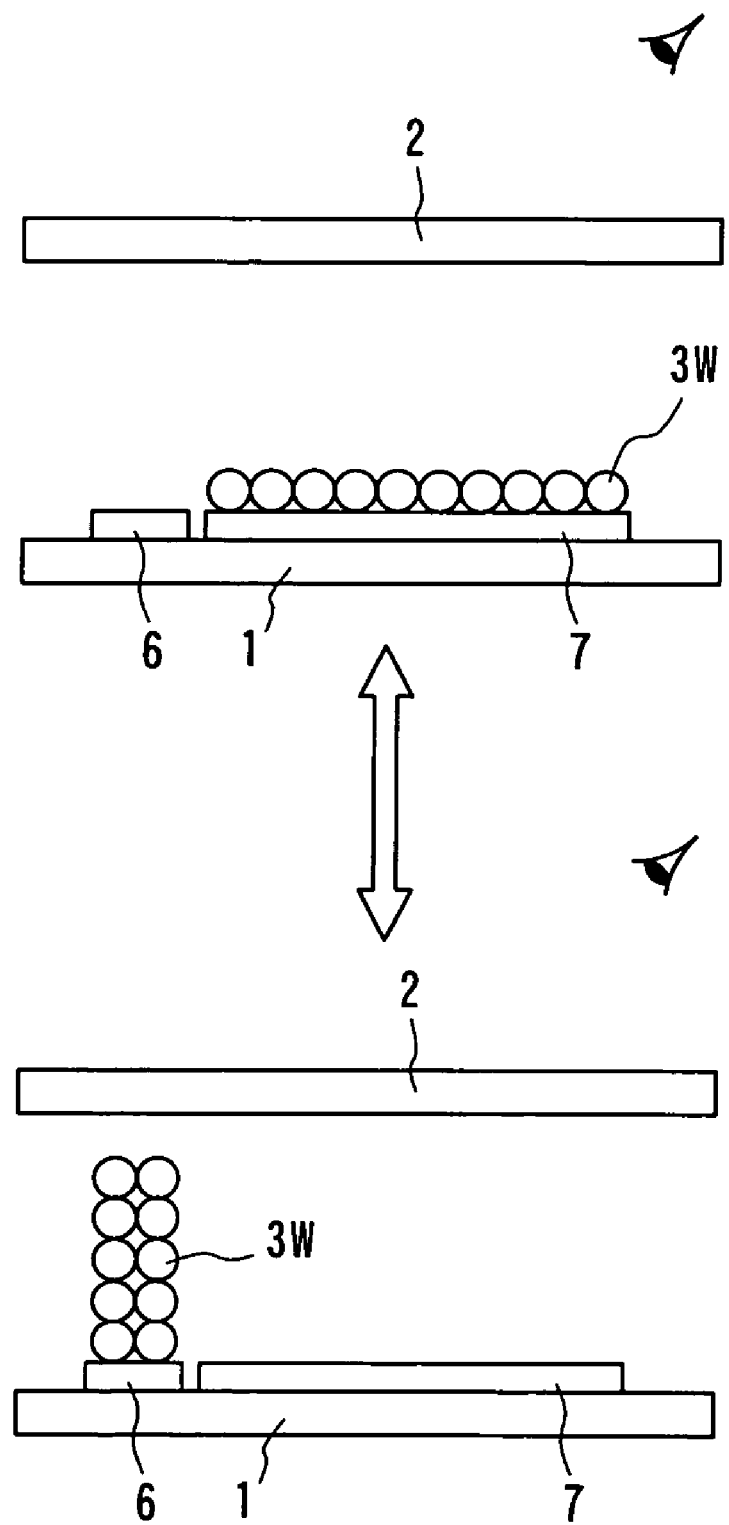
FIG. 3 is a schematic view depicting still another embodiment of an information display panel constituting an information display device according to a first aspect of the invention.
Figure 4:
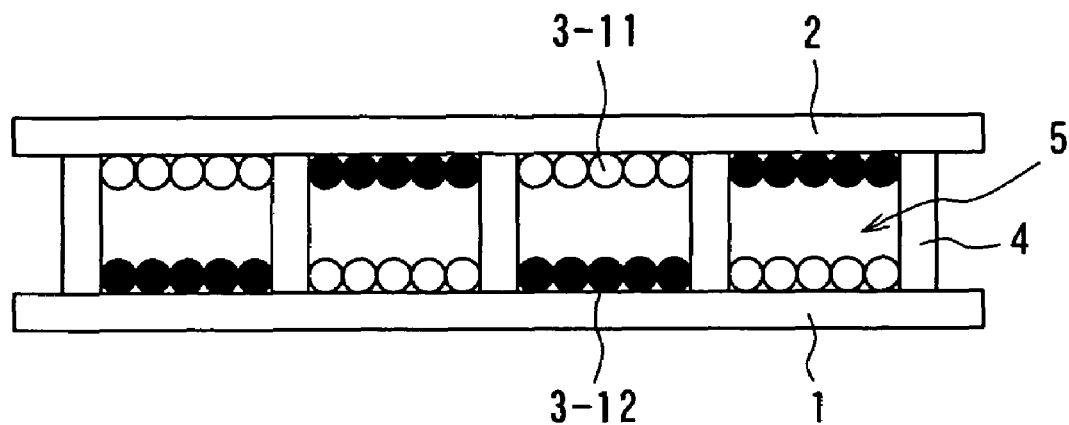
FIG. 4 is a schematic view showing one construction of an information display panel according to a first aspect of the invention.

FIGS. 1-3 are schematic views respectively showing one embodiment of the information display panel constituting the information display device according to a first aspect of the invention. FIG. 4 is a schematic view showing one construction of the information display device according to a first aspect of the invention. In the explanation mentioned below, the explanation is made to the particles as a first aspect of the invention, but the same explanation can be applied to the liquid powders as a second aspect of the invention.

The information display panel according to a first aspect of the invention is an information display panel using a display method (referring to FIG. 1) in which two or more groups of particles 3 having different colors and different charge characteristics are moved in a vertical direction with respect to substrates 1 and 2 so as to display information such as an image, and, an information display panel using a display method (referring to FIG. 2 and FIG. 3) in which one group of the particles 3 having one color are moved in a horizontal direction with respect to the substrates 1 and 2 so as to display information such as an image. Moreover, in the construction of the information display panel according to a first aspect of the invention, as shown in FIG. 4, predetermined particles 3 (3-11, 3-12) are filled in cells 5 formed between the substrates 1 and 2 by partition walls 4 in for example grid like shape.

In FIG. 1, numerals 6 and 7 are electrodes for applying an electrostatic field to the particles 3 or the liquid powders 3. When an electrostatic field is applied to the panel in which the particles or the liquid powders are sealed between the opposed substrates, the particle (constituting the particles or the liquid powders) charged at a low potential is attracted toward a high potential portion by means of Coulomb's force and so on, and, the particle (constituting the particles or the liquid powders) charged at a high potential is attracted toward at a high potential is attracted toward a low potential portion. In this manner, the information display such as an image can be achieved by performing a reciprocal movement of the particle (constituting the particles or the liquid powders) along a direction of the applied electrostatic field. Here, as to forces applied to the particle (constituting the particles or the liquid powders), there are an attraction force between the particles due to Coulomb' force, an imaging force with respect to the electrode panel, an intermolecular force, a liquid bonding force and a gravity.

In FIG. 2, a numeral 6 is one of paired electrodes, and an electrostatic field is applied between this electrode and the other electrode, which is paired with this electrode and arranged on the substrate, so that the particles or the liquid powders sealed between opposed substrates are moved in a horizontal direction of the display panel. In FIG. 2, an upper schematic view shows a state such that a color of the particles or the liquid powders is displayed, and, a lower schematic view illustrates a state such that a color of an inner surface of the substrate 1 is displayed.

In FIG. 3, numerals 6 and 7 are paired electrodes, and an electrostatic field is applied between the electrodes 6 and 7, so that the particles or the liquid powders sealed between opposed substrates are moved in a horizontal direction of the display panel. In FIG. 3, an upper schematic view shows a state such that a color of the particles or the liquid powders is displayed, and, a lower schematic view illustrates a state such that a color of the electrode 6 or a color of an inner surface of the substrate 1 in the case of a transparent electrode 6 is displayed.

Then, an electrode construction, which is a feature of the information display device according to the invention, will be explained with reference to FIG. 5.

Figure 5:
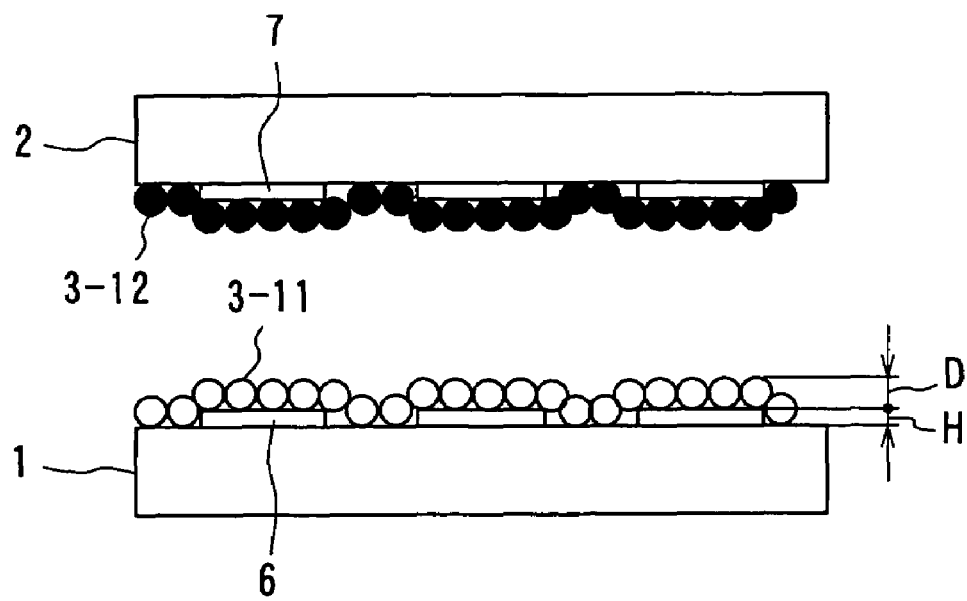
FIG. 5 is a schematic view explaining requirements of an electrode construction of the information display device according to a first aspect and a second aspect of the invention.

FIG. 5 is a schematic view explaining requirements of an electrode construction of the information display device according to a first aspect (particles) and a second aspect (liquid powders) of the invention. In FIG. 5, when H is assumed to be a height of the electrodes 6, 7 (which is from a surface of the substrate to an upper surface of the electrode) provided in a matrix manner on the substrates 1, 2, and, D is assumed to be a particle diameter of the particles (particles 3-11 and 3-12), the following relation is satisfied: $D \geq 2H$, i.e., the electrode is made thinner as much as possible in such a manner that the height H of the electrode is lower than a half of the particle diameter D. In this manner, a surface of the substrate is made smooth, and a possibility of plugging the particles into the gap between adjacent electrodes on the substrate becomes lower. In addition, since the particle diameter D is two times or more than the electrode height H, the particles are easily removed even if the particles are plugged into the gap. Therefore, it is possible to provide the information display device, which can improve a contrast ratio after endurance.

Hereinafter, as to respective construction members of the information display device according to the invention, common construction member portion of the first aspect and the second aspect, a feature of the particles (first aspect of the invention), and a feature of the liquid powders (second aspect of the invention) will be explained in detail in this order.

At first, the substrate will be explained.

At least one of the substrates 1, 2 is the transparent substrate through which a color of the particle (constituting the particles or the liquid powders) can be observed from outside of the device, and it is preferred to use a material having a high transmission factor of visible light and an excellent heat resistance. The presence of flexibility is selected appropriately by the usage, for example, the flexible materials are selected for the usage as an electronic paper and so on, and materials having no flexibility are selected for the usage as display units for portable devices such as cellular phones, PDAs, and notebook personal computers.

Examples of the substrate material include polymer sheets such as polyethylene terephthalate, polyether sulfone, polyethylene, polycarbonate, and inorganic sheets such as glass, quartz or so.

The thickness of the substrate is preferably 2 to 5000 μm, more preferably 5 to 1000 μm. When the thickness is too thin, it becomes difficult to maintain strength and distance uniformity between the substrates, and when the thickness is too thick, decreases of sharpness on a display function and contrast occur, and particularly flexibility is not sufficient if it is used as electric paper.

The electrode according to the invention is arranged on at least one substrate (inner surface of the substrate), but a coating layer may be arranged thereon.

In the case of arranging the electrode on both substrates, the particles (liquid powders) arranged corresponding to the electrode portion, in such a manner that the colored particles (liquid powders) charged in a predetermined characteristic are attracted or bounded reversely by applying an electrostatic field generated at respective electrode position on the substrate by means of an external power input toward the electrode portions, are observed from an outside of the display device through the transparent substrate.

In this case, as to a material for forming the electrode arranged on the substrate, use is made of metals such as aluminum, silver, nickel, copper, gold, or, conductive metal oxides such as ITO, indium oxide, conductive tin oxide, conductive zinc oxide and so on, or, conductive polymers such as polyaniline, polypyrrole, polythiophene and so on, and they are used by being suitably selected. As an electrode forming method, use is made of a method in which the materials mentioned above are made to a thin film by means of sputtering method, vacuum vapor deposition method, CVD (chemical vapor deposition) method, coating method and so on, or, a method in which conductive materials and solvents are mixed with synthetic resin binder and the mixture is sprayed. A transparency is necessary for the electrode arranged to the substrate at an observation side, but it is not necessary to the substrate at a rear side. In both cases, the materials mentioned above, which have a pattern formation capability, can be suitably used. Additionally, the thickness of the electrode may be suitable unless the electro-conductivity is absent or any hindrance exists in optical transparency, and it is preferable to be 3 to 1000 nm, more preferable to be 5 to 400 nm. The material and the thickness of the electrode arranged to the rear substrate are the same as those of the electrode arranged to the substrate at the display side, but transparency is not necessary.

In this case, the applied outer voltage may be superimposed with a direct current or an alternate current.

In the present invention, a shape of the partition wall is suitably designed in accordance with a kind of the particle (constituting the particles or the liquid powders) used for the display and is not restricted. However, it is preferred to set a width of the partition wall to 1-100 μm more preferably 2-50 μm and to set a height of the partition wall to 10-5000 μm more preferably 10-500 μm.

Moreover, as a method of forming the partition wall, use may be made of a double rib method wherein ribs are formed on the opposed substrates respectively and they are connected with each other and a single rib method wherein a rib is formed on one of the opposed substrates only. The present invention may be preferably applied to both methods mentioned above.

Figure 6:
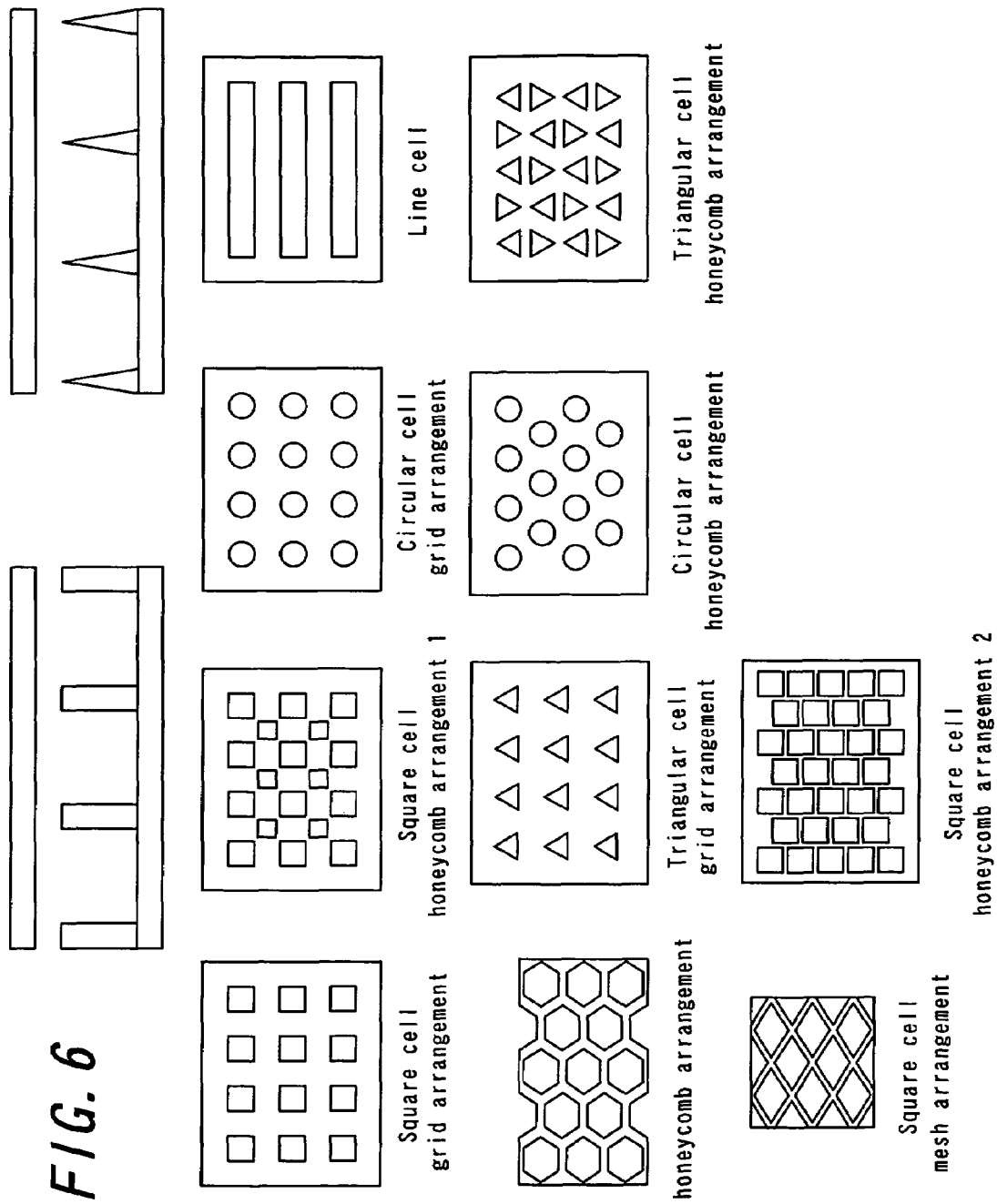
FIG. 6 is a schematic showing one embodiment of a shape of the partition walls in the information display panel according to the invention.

The cell formed by the partition walls each made of rib has a square shape, a triangular shape, a line shape, a circular shape and a hexagon shape, and has an arrangement such as a grid, a honeycomb and a mesh, as shown in FIG. 6 viewed from a plane surface of the substrate. It is preferred that the portion corresponding to a cross section of the partition wall observed from the display side (an area of the frame portion of the display cell) should be made as small as possible. In this case, a clearness of the image display can be improved.

Here, as to the formation method of the partition wall, use is made of a die transfer method, a screen-printing method, a sandblast method, a photolithography method and an additive method. Among them, it is preferred to use a photolithography method using a resist film or a die transfer method.

Then, the particle constituting the particles used in the first aspect of the invention will be explained.

The particle may be formed by mixing necessary resin, charge control agent, coloring agent, additive and so on and grinding them, or, by polymerizing from monomer, or, by coating a particle with resin, charge control agent, coloring agent, and additive and so on.

Hereinafter, typical examples of resin, charge control agent, coloring agent, additive and so on will be explained.

Typical examples of the resin include urethane resin, acrylic resin, polyester resin, acryl urethane resin, silicone resin, nylon resin, epoxy resin, styrene resin, butyral resin, vinylidene chloride resin, melamine resin, phenolic resin, fluorocarbon polymers, and it is possible to combine two or more resins. For the purpose of controlling the attaching force with the substrate, it is preferred to use polyester resin, acryl urethane resin, acryl urethane silicone resin, acryl urethane fluorocarbon polymers, urethane resin, and fluorocarbon polymers.

Examples of the electric charge control agent include, positive charge control agent such as the fourth grade ammonium salt compound, nigrosine dye, triphenylmethane compound, imidazole derivatives, and so on, and negative charge control agent such as metal containing azo dye, salicylic acid metal complex, nitroimidazole derivative and so on.

As for a coloring agent, various kinds of basic or acidic dye may be employable. Examples include Nigrosine, Methylene Blue, quinoline yellow, rouge (red iron oxide) and so on.

Examples of the inorganic additives include titanium oxide, Chinese white, zinc sulfide, antimonial oxide, calcium carbonate, zinc white, talc, silica, calcium silicate, alumina white, cadmium yellow, cadmium red, cadmium orange, titanium yellow, iron blue, ultramarine blue, cobalt blue, cobalt green, cobalt violet, ferric oxide, carbon black, manganese ferrite black, cobalt ferrite black, copper powder, aluminum powder and so on.

Here, in order to further improve a repeating durability, it is effective to control stabilities of the resin constituting the particles, particularly, a water absorbing rate and a solvent insoluble rate of the resin constituting the particles.

It is preferred that the water absorbing rate of the resin constituting the particles sealed between the substrates is not more than 3 wt % especially not more than 2 wt %. In this case, a measurement of the water absorbing rate is performed according to ASTM-D570 and a measuring condition is 23° C. for 24 hours.

As for the solvent insoluble rate of the resin constituting the particles, it is preferred that a solvent insoluble rate of the particles, which is defined by the following formula, is not less than 50% more preferably not less than 70%:

solvent insoluble rate (%)=$(B/A) \times 100$;

(here, A is a weight of the resin component before being immersed into the solvent and B is a weight of resin components after the particles are immersed into good solvent at 25° C. for 24 hours).

If the solvent insoluble rate is less than 50%, a bleed is generated on a surface of the particle material constituting the particles when maintaining for a long time. In this case, it affects an adhesion power with the particles and prevents a movement of the particles. Therefore, there is a case such that it affects a durability of the image display.

Here, as a solvent (good solvent) for measuring the solvent insoluble rate, it is preferred to use fluoroplastic such as methyl ethyl ketone and so on, polyamide resin such as methanol and so on, acrylic urethane resin such as methyl ethyl ketone, toluene and so on, melamine resin such as acetone, isopropanol and so on, silicone resin such as toluene and so on.

Moreover, it is preferred that the particle has a circular shape.

In the present invention, it is preferred that particle diameter distribution Span of the particles, which is defined by the following formula, is not more than 5 preferably not more than 3:

Span=$(d(0.9)-d(0.1))/d(0.5)$;

(here, $d(0.5)$ means a value of the particle diameter expressed by μm wherein an amount of the particles having the particle diameter larger than or smaller than this value is 50%, $d(0.1)$ means a value of the particle diameter expressed by μm wherein an amount of the particles having the particle diameter smaller than this value is 10%, and $d(0.9)$ means a value of the particle diameter expressed by μm wherein an amount of the particles having the particle diameter smaller than this value is 90%).

If the particle diameter distribution Span of the particles is set to not more than 5, the particle diameter becomes even and it is possible to perform an even particle movement.

Further, it is preferred to set the average particle diameter $d(0.5)$ of the particle to 0.1-50 μm and to use even particles. If the average particle diameter $d(0.5)$ exceeds this range, the image clearness sometimes deteriorated, and, if the average particle diameter is smaller than this range, an agglutination force between the particles becomes larger and the movement of the particles is prevented.

Furthermore, as a correlation between the particles, it is preferred to set a ratio of $d(0.5)$ of the particles having smallest diameter with respect to $d(0.5)$ of the particles having largest diameter to not more than 50 preferably not more than 10.

In the case of using two or more groups of particles having different colors and different charge characteristics, the particles having different charge characteristics with each other are moved reversely, if the particle diameter distribution Span is made smaller. Therefore, it is preferred that the particle sizes of the particles are made to be even with each other, and same amounts of the particles are easily moved in a reverse direction, and thus that is this range.

Here, the particle diameter distribution and the particle diameter mentioned above can be measured by means of a laser diffraction/scattering method. When a laser light is incident upon the particles to be measured, a light intensity distribution pattern due to a diffraction/scattering light occurs spatially. This light intensity distribution pattern corresponds to the particle diameter, and thus it is possible to measure the particle diameter and the particle diameter distribution.

In the present invention, it is defined that the particle diameter and the particle diameter distribution are obtained by a volume standard distribution. Specifically, the particle diameter and the particle diameter distribution can be measured by means of a measuring apparatus Mastersizer 2000 (Malvern Instruments Ltd.) wherein the particles setting in a nitrogen gas flow are calculated by an installed analysis software (which is based on a volume standard distribution due to Mie's theory).

A surface charge density used in the invention of the particle, can be measured as mentioned below. That is, according to a blow-off method, the particles and carrier particles are sufficiently contacted and a saturated charge amount thereof is measured, so that a charge amount per a unit weight of the particles can be measured. Then, a particle diameter and a specific gravity of the particles are separately measured, and the surface charge density of the particles is calculated by using them.

<Blow-off Measuring Theory and Method>

In the blow-off method, a mixture of the powders and the carriers are placed into a cylindrical container with nets at both ends, and high-pressure gas is blown from the one end to separate the powders and the carriers, and then only the powders are blown off from the mesh of the net. In this occasion, charge amount of reverse blown polarity remains on the carriers with the same charge amount of the powders carried away out of the container. Then, all of electric flux by this electric charge are collected to Faraday cage, and are charged across a capacitor with this amount. Accordingly, the charge amount of the particles is determined as:

Q=CV (C: capacity, V: voltage across both ends of the capacitor) by measuring potential of both ends of the capacitor.

As a blow-off powder charge amount measuring instrument, TB-200 produced by Toshiba Chemical Co., Ltd. was used.

In the present invention, carrier particles (F963-2535 available from Powder TEC Co., Ltd.) was employed as the same kind of carriers, and a charge density (μC/g) per unit weight of a substance to be measured (the particle constituting the particles or the liquid powders) was measured. Then, a surface charge density ($\mu C/m^2$) of the particle (constituting the particles or the liquid powders) was calculated from the average particle diameter and specific gravity measured separately.

<Method of Measuring Specific Gravity of the Particle>

A specific gravity was measured by a multi-volume density meter H1305 produced by Shimadzu Corporation.

Then, the liquid powders used in the second aspect of the invention will be explained.

In the present invention, a term "liquid powders" means an intermediate material having both of liquid properties and particle properties and exhibiting a self-fluidity without utilizing gas force and liquid force. Preferably, it is a material having an excellent fluidity such that there is no repose angle defining a fluidity of powder. For example, a liquid crystal is defined as an intermediate phase between a liquid and a solid, and has a fluidity showing a liquid characteristic and an anisotropy (optical property) showing a solid characteristic (Heibonsha Ltd.: encyclopedia). On the other hand, a definition of the particle is a material having a finite mass if it is vanishingly small and receives an attraction of gravity (Maruzen Co., Ltd.: physics subject-book). Here, even in the particles, there are special states such as gas-solid fluidized body and liquid-solid fluidized body. If a gas is flown from a bottom plate to the particles, an upper force is acted with respect to the particles in response to a gas speed. In this case, the gas-solid fluidized body means a state that is easily fluidized when the upper force is balanced with the gravity. In the same manner, the liquid-solid fluidized body means a state that is fluidized by a liquid. (Heibonsha Ltd.: encyclopedia) In the present invention, it is found that the intermediate material having both of fluid properties and solid properties and exhibiting a self-fluidity without utilizing gas force and liquid force can be produced specifically, and this is defined as the liquid powders.

That is, as is the same as the definition of the liquid crystal (intermediate phase between a liquid and a solid), the liquid powders according to the invention are a material showing the intermediate state having both of liquid properties and particle properties, which is extremely difficult to receive an influence of the gravity showing the particle properties mentioned above and indicates a high fluidity. Such a material can be obtained in an aerosol state i.e. in a dispersion system wherein a solid-like or a liquid-like material is floating in a relatively stable manner as a dispersant in a gas, and thus, in the information display device according to the invention, a solid material is used as a dispersant.

The information display panel which is a target of the present invention has a construction such that the liquid powders composed of a solid material stably floating as a dispersant in a gas and exhibiting a high fluidity in an aerosol state are sealed between opposed two substrates, wherein one of two substrates is transparent. Such liquid powders can be made to move easily and stably by means of Coulomb's force and so on generated by applying a low voltage.

As mentioned above, the liquid powders means an intermediate material having both of liquid properties and particle properties and exhibiting a self-fluidity without utilizing gas force and liquid force. Such liquid powders become particularly an aerosol state. In the information display device according to the invention, the liquid powders used in a state such that a solid material is relatively and stably floating as a dispersant in a gas.

As the aerosol state, it is preferred that an apparent volume in a maximum floating state is two times or more than that in none floating state, more preferably 2.5 times or more than that in none floating state, and most preferably three times or more than that in none floating state. In this case, an upper limit is not defined, but it is preferred that an apparent volume is 12 times or smaller than that in none floating state.

If the apparent volume in the maximum floating state is smaller than two times, a display controlling becomes difficult. On the other hand, if the apparent volume in the maximum floating state is larger than 12 times, a handling inconvenience during a liquid powders filling operation into the device such as a particle over-scattering occurs. That is, it is measured by filling the liquid powders in a transparent closed vessel through which the liquid powders are seen; vibrating or dropping the vessel itself to obtain a maximum floating state; and measuring an apparent volume at that time from outside of the vessel. Specifically, the liquid powders having a volume 1/5 of the vessel are filled as the liquid powders in a polypropylene vessel with a cap having a diameter (inner diameter) of 6 cm and a height of 10 cm (product name I-boy produced by As-one Co., Ltd.), the vessel is set in the vibrator, and a vibration wherein a distance of 6 cm is repeated at a speed of 3 reciprocating/sec. is performed for 3 hours. Then, the apparent volume in the maximum floating state is obtained from an apparent volume just after a vibration stop.

Moreover, in the information display device according to the invention, it is preferred that a time change of the apparent volume of the liquid powders satisfies the following formula:

$$V_{10}/V_5 > 0.8;$$

here, $V_5$ indicates the apparent volume (cm$^3$) of the liquid powders after 5 minutes from the maximum floating state; and $V_{10}$ indicates the apparent volume (cm$^3$) of the liquid powders after 10 minutes from the maximum floating state. In this case, in the information display panel according to the invention, it is preferred to set the time change $V_{10}/V_5$ of the apparent volume of the liquid powders to larger than 0.85, more preferably larger than 0.9, most preferably larger than 0.95. If the time change $V_{10}/V_5$ is not larger than 0.8, the liquid powders are substantially equal to normal particles, and thus it is not possible to maintain a high speed response and durability according to the invention.

Moreover, it is preferred that the average particle diameter d(0.5) of the particle materials constituting the liquid powders is 0.1-20 μm, more preferably 0.5-15 μm, most preferably 0.9-8 μm. If the average particle diameter d(0.5) is less than 0.1 μm, a display controlling becomes difficult. On the other hand, if the average particle diameter d(0.5) is larger than 20 μm, a display is possible, but opacifying power is decreased and thus a thin shape device is difficult. Here, the average particle diameter d(0.5) of the particle materials constituting the liquid powders is equal to d(0.5) in the following particle diameter distribution Span.

It is preferred that particle diameter distribution Span of the particle material constituting the liquid powders, which is defined by the following formula, is not more than 5 preferably not more than 3:

Particle diameter distribution: Span=(d(0.9)−d(0.1))/d(0.5);

here, d(0.5) means a value of the particle diameter expressed by μm wherein an amount of the particle material constituting the liquid powders having the particle diameter larger than this value is 50% and an amount of the particle material constituting the liquid powders having the particle diameter expressed by μm wherein an amount of the particle material constituting the liquid powders having a particle diameter smaller than this value is 10%, and d(0.9) means a value of the particle diameter expressed by μm wherein an amount of the particle material constituting the liquid powders having the particle diameter smaller than this value is 90%. If the particle diameter distribution Span of the particle materials constituting the liquid powders is set to not more than 5, the particle diameter becomes even and it is possible to perform an even liquid powders movement.

Here, the particle diameter distribution and the particle diameter mentioned above can be measured by means of a laser diffraction/scattering method. When a laser light is incident upon the particles to be measured, a light intensity distribution pattern due to a diffraction/scattering light occurs spatially. This light intensity distribution pattern corresponds to the particle diameter, and thus it is possible to measure the particle diameter and the particle diameter distribution. In the present invention, it is defined that the particle diameter and the particle diameter distribution are obtained by a volume standard distribution. Specifically, the particle diameter and the particle diameter distribution can be measured by means of a measuring apparatus Mastersizer 2000 (Malvern Instruments Ltd.) wherein the particles setting in a nitrogen gas flow are calculated by an installed analysis software (which is based on a volume standard distribution due to Mie's theory).

The liquid powders may be formed by mixing necessary resin, charge control agent, coloring agent, additive and so on and crushing them, or, by polymerizing from monomer, or, by coating a particle with resin, charge control agent, coloring agent, and additive and so on. Hereinafter, typical examples of resin, charge control agent, coloring agent, additive and so on constituting the liquid powders will be explained.

Typical examples of the resin include urethane resin, acrylic resin, polyester resin, acryl urethane resin, silicone resin, nylon resin, epoxy resin, styrene resin, butyral resin, vinylidene chloride resin, melamine resin, phenolic resin, fluorocarbon polymers, and it is possible to combine two or more resins. For the purpose of controlling the attaching force with the substrate, acryl urethane resin, acryl urethane silicone resin, acryl urethane fluorocarbon polymers, urethane resin, fluorocarbon polymers are preferred.

Examples of the electric charge control agent include, positive charge control agent such as the fourth grade ammonium salt compound, nigrosine dye, triphenylmethane compound, imidazole derivatives, and so on, and negative charge control agent such as metal containing azo dye, salicylic acid metal complex, nitroimidazole derivative and so on.

As for a coloring agent, various kinds of basic or acidic dye may be employable. Examples include Nigrosine, Methylene Blue, quinoline yellow, rouge (red iron oxide) and so on.

Examples of the inorganic additives include titanium oxide, Chinese white, zinc sulfide, antimonial oxide, calcium carbonate, zinc white, talc, silica, calcium silicate, alumina white, cadmium yellow, cadmium red, cadmium orange, titanium yellow, iron blue, ultramarine blue, cobalt blue, cobalt green, cobalt violet, ferric oxide, carbon black, copper powder, aluminum powder and so on.

However, if the above materials are only mixed or coated with no contrivance, the liquid powders exhibiting an aerosol state cannot be obtained. The regular method of forming the liquid powders exhibiting an aerosol state is not defined, but the following method is preferably used.

At first, inorganic fine particles having an average particle size of 20-100 nm preferably 20-80 nm are preferably fixed on a surface of materials constituting the liquid powders. Moreover, it is preferred that the inorganic fine particles are made of tow or more groups of fine particles. Further, it is preferred to treat the inorganic fine particles by silicone oil. Here, as for the inorganic fine particles, use may be made of silicon dioxide (silica), zinc oxide, aluminum oxide, magnesium oxide, cerium oxide, ferric oxide, copper oxide and so on. In this case, a method of fixing the inorganic fine particles is important. For example, use may be made of hybridizer (NARA Machinery Industry Co., Ltd.) or mechano-fusion (Hosokawa Micron Co., Ltd.), and the liquid powders showing an aerosol state are formed under a predetermined condition (for example processing time).

Here, in order to further improve a repeating durability, it is effective to control stabilities of the resin constituting the liquid powders, particularly, a water absorbing rate and a solvent insoluble rate of the resin constituting the liquid powders. It is preferred that the water absorbing rate of the resin constituting the liquid powders sealed between the substrates is not more than 3 wt % especially not more than 2 wt %. In this case, a measurement of the water absorbing rate is performed according to ASTM-D570 and a measuring condition is 23° C. for 24 hours. As for the solvent insoluble rate of the resin constituting the liquid powders, it is preferred that a solvent insoluble rate of the particles, which is defined by the following formula, is not less than 50% more preferably not less than 70%:

$$\text{solvent insoluble rate (\%)} = (B/A) \times 100;$$

(here, A is a weight of the resin component before being immersed into the solvent and B is a weight of resin components after the particles are immersed into good solvent at 25° C. for 24 hours).

If the solvent insoluble rate is less than 50%, a bleed is generated on a surface of the particle material constituting the particles when maintaining for a long time. In this case, it affects an adhesion power with the particles and prevents a movement of the particles. Therefore, there is a case such that it affects a durability of the image display. Here, as a solvent (good solvent) for measuring the solvent insoluble rate, it is preferred to use fluoroplastic such as methyl ethyl ketone and so on, polyamide resin such as methanol and so on, acrylic urethane resin such as methyl ethyl ketone, toluene and so on, melamine resin such as acetone, isopropanol and so on, silicone resin such as toluene and so on.

Moreover, as a filling amount of the particles or the liquid powders, the filling amount (volume occupying rate) of the particles or the liquid powders is preferable to be 5 to 70 vol %, more preferable to be 5 to 65 vol %, further more preferable to be 5 to 55 vol %. When the volume occupying rate of the particles or the liquid powders is less than 5 vol %, it is not possible to display a clear image. When the volume occupying rate exceeds 70 vol %, the particles or the liquid powders are not easily moved.

Further, in the present invention, it is important to control a gas in a gap surrounding the particles or the liquid powders between the substrates, and a suitable gas control contributes an improvement of display stability. Specifically, it is important to control a humidity of the gap gas to not more than 60% RH at 25° C., preferably not more than 50% RH, more preferably not more than 35% RH.

The above gap means a gas portion surrounding the powders or liquid powders obtained by substituting an occupied portion of the particles or liquid powders 3, an occupied portion of the partition walls 4 (in the case of arranging the partition wall) and a seal portion of the information device panel in FIG. 4.

A kind of the gap gas is not limited if it has the humidity mentioned above, but it is preferred to use dry air, dry nitrogen gas, dry argon gas, dry helium gas, dry carbon dioxide gas, dry methane gas and so on.

It is necessary to seal this gas in the device so as to maintain the humidity mentioned above. For example, it is important to perform the operations of filling the particles or the liquid powders and assembling the substrate under an atmosphere having a predetermined humidity and to apply a seal member and a seal method for preventing a humidity inclusion from outside of the device.

Hereinafter, the present invention will be explained further specifically with reference to examples and comparative examples. However, the present invention is not limited to the below experiment.

Function measurement and estimation as the panel were performed according to below standard with respect to the manufactured information display panel. The results are shown in Table 1; first aspect of the invention (third aspect of the invention) and Table 2; second aspect of the invention (fourth aspect of the invention).

EXAMPLE 1; FIRST ASPECT OF THE INVENTION (THIRD ASPECT OF THE INVENTION IS THE SAME EXCEPT THAT PARTICLES ARE SUBSTITUTED BY LIQUID POWDERS

An information display panel was manufactured in the following manner.

Figure 7:
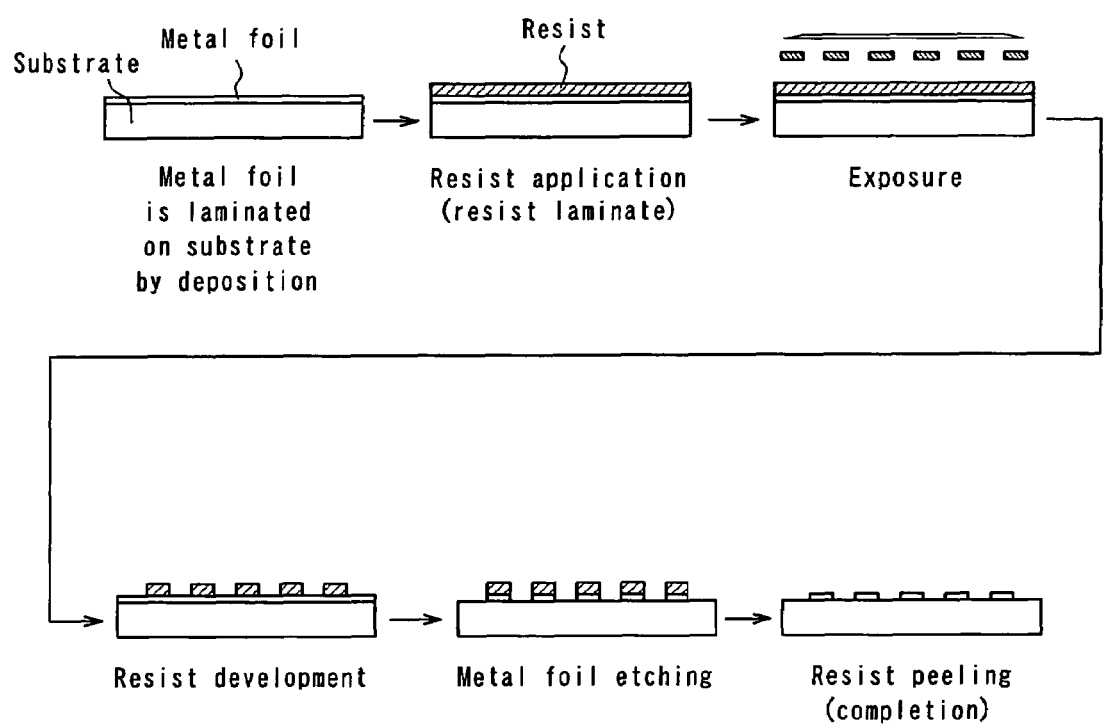
FIG. 7 is a schematic view explaining a method of manufacturing an information display panel of an example 1 according to the invention.

At first, as shown in FIG. 7, a substrate (for example, glass epoxy substrate of 7 cm×7 cm square) was prepared, and a metal foil (here, aluminum foil having a thickness of 3 µm) was laminated thereon. Then, a resist was applied to the metal foil, and after that exposure, resist development, metal foil etching and resist peeling operations were performed successively so as to form a substrate with electrode. In the thus formed substrate, a size of respective electrodes arranged in a matrix manner was 300 µm×300 µm, a height (H) of the electrode was 3 µm and a gap between adjacent electrodes was 50 µm.

Then, a rib having a height of 50 µm was formed on the substrate with electrode so as to form partition walls having a stripe shape.

The rib formation was performed as follows. A dry-film photoresist NIT 250 produced by Nichigo-Morton Co., Ltd., which is a photosensitive film, was laminated on an ITO glass, and then exposure and development operations were performed thereto so as to form the desired partition walls having a line of 30 µm, a space of 320 µm and a pitch of 350 µm. Then, a cell was formed on the substrate between the partition walls.

Then, two groups of particles (particles A, particles B) were prepared. In this case, since it is preferred that a particle diameter of the particle constituting the particles A and the particles B is set to two times or more of the height H of the electrode, here, use was made of the particles having a particle diameter D of 6 µm (D=2H=6 µm) respectively.

The particles A (black color particles) were produced in such a manner that acrylic urethane resin: EAU53B (Asia Industry Co., Ltd.)/IPDI cross linking agent: Excel-Hardener HX (Asia Industry Co., Ltd.), Carbon M100 (Mitsubishi Chemical Corporation) 4 phr, charge control agent: BontronN07 (Orient Chemical Industries Ltd.) 2 phr were added, mixed, ground and classified by a jet-mill.

The particles B (white color particles) were produced in such a manner that acrylic urethane resin: EAU53B (Asia Industry Co., Ltd.)/IPDI cross linking agent: Excel-Hardener HX (Asia Industry Co., Ltd.), titanium oxide 10 phr, charge control agent: BontronE89 (Asia Industry Co., Ltd.) 2 phr were added, mixed, ground and classified by the jet-mill.

The particles A were filled in the cells 5 by: scattering the particles A as first particles 3-11 in the container from a nozzle arranged at an upper portion of the container; and filling the scattered particles A in the cells 5 on the substrate 1 provided at a lower portion of the container. Continuously, the particles B were filled in the cells 5 on the particles A by: scattering the particles B as second particles 3-12 in the container from the nozzle arranged at an upper portion of the container; and filling the scattered particles B in the cells 5 (in which the particles A were previously filled) on the substrate 1 provided at a lower portion of the container. The same amounts of the particles A and the particles B were mixed with each other, and a total filling rate (volume occupying rate) of the both particles with respect to a space between two substrates was controlled to become 25 vol %.

Then, with respect to the substrate with electrode (substrate 1) whose cells were filled by the particles A and the particles B, another substrate with electrode (substrate 2) manufactured in the same manner as mentioned above was stacked. In this case, the peripheral portions of the substrates were connected with each other by using an epoxy adhesive and the particles were sealed therein, so that the image display panel was manufactured. Here, as a gap gas, use was made of a dry nitrogen gas having a dew point of −40° C.

The information display panel according to the example 1 manufactured in the manner mentioned above had an initial contrast ratio and a contrast ratio after endurance as shown in Table 1.

EXAMPLE 2; FIRST ASPECT OF THE INVENTION (THIRD ASPECT OF THE INVENTION IS THE SAME EXCEPT THAT PARTICLES ARE SUBSTITUTED BY LIQUID POWDERS

Figure 8:
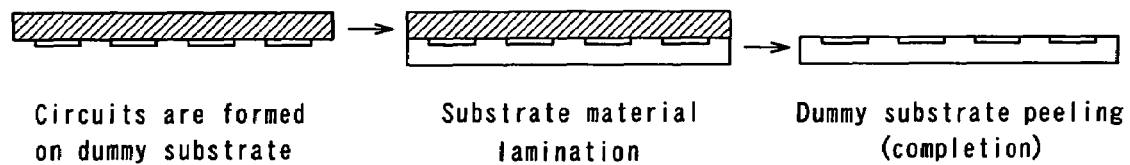
FIG. 8 is a schematic view explaining a method of manufacturing an information display panel of an example 2 according to the invention.

The information display panel was manufactured in the same manner as that of the example 1 except that the manufacturing method of the substrate with electrode was changed to a "transfer method" shown in FIG. 8 and use was made of the particles having a particle diameter D of 0.4 µm (D=2H=0.4 µm). That is, as shown in FIG. 8, a dummy substrate (for example, 7 cm×7 cm square) was prepared, and circuits corresponding to a matrix electrode mentioned below were formed on an under surface thereof. Then, with respect to a lower portion of the dummy substrate to which the circuits were formed, a glass epoxy constituting a substrate material was laminated, so as to form the same substrate as that of the example 1 (for example, 7 cm×7 cm square). After that, the dummy substrate was peeled off, and the substrate with electrode was formed. In the thus formed substrate, a size of respective electrodes arranged in a matrix manner was 300 µµm×300 µm, a height (H) of the electrode was 0.2 µm and a gap between adjacent electrodes was 50 µm.

Hereinafter, as is the same as the example 1, the information display panel according to the example 2 was manufactured. The thus manufactured information display panel had an initial contrast ratio and a contrast ratio after endurance as shown in Table 1.

COMPARATIVE EXAMPLE 1 (COMPARED WITH THE EXAMPLE 1)

An information display panel was manufactured in the following manner.

Figure 9:
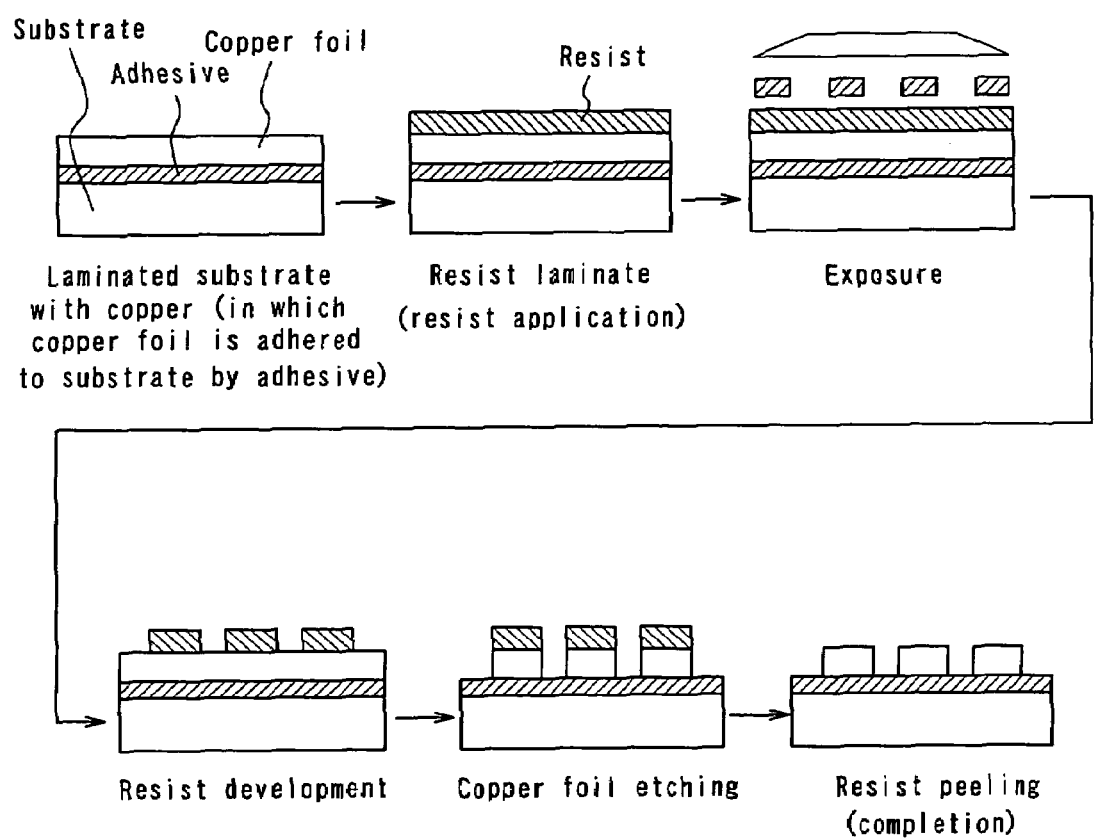
FIG. 9 is a schematic view explaining a method of manufacturing an information display panel of a comparative example 1 as compared with the example 1 according to the invention.

At first, as shown in FIG. 9, a laminated substrate with copper (a copper foil having a thickness of 12 µm was adhered to a substrate such as a glass epoxy substrate; for example 7 cm×7 cm square) was prepared. Then, a resist was laminated on the copper foil, and after that exposure, resist development, copper foil etching and resist peeling operations were performed successively so as to form a substrate with electrode. In the thus formed substrate, a size of respective electrodes arranged in a matrix manner was 300 μm×300 μm, a height (H) of the electrode was 12 μm and a gap between adjacent electrodes was 50 μm.

Hereinafter, as is the same as the example 1, the information display panel according to the comparative example 1 was manufactured. The thus manufactured information display panel had an initial contrast ratio and a contrast ratio after endurance as shown in Table 1.

EXAMPLE 3; SECOND ASPECT OF THE INVENTION (FOURTH ASPECT OF THE INVENTION IS THE SAME EXCEPT THAT PARTICLES ARE SUBSTITUTED BY LIQUID POWDERS

Figure 10:
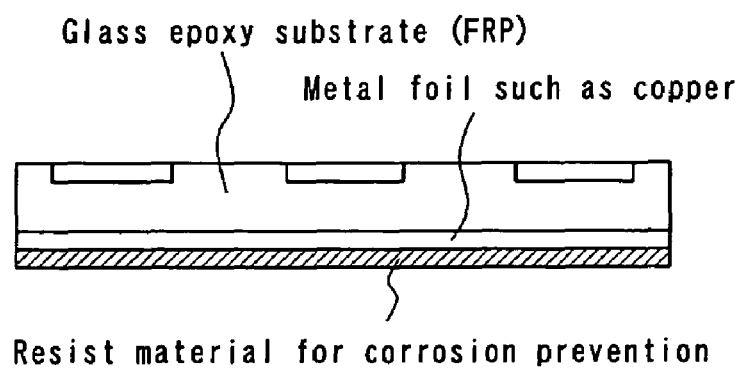
FIG. 10 is a schematic view explaining a method of manufacturing an information display panel of an example 3 according to the invention.
Figure 11:
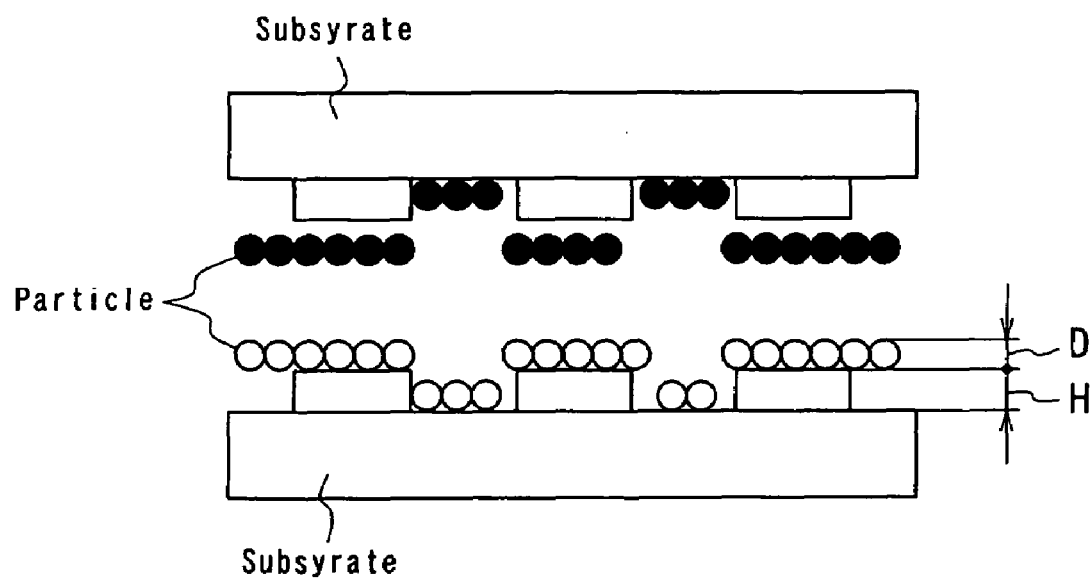
FIG. 11 is a schematic view explaining requirements for generating a display defect in the known information display device.

The substrate with electrode was manufactured as is the same as the example 2, but the following change is applied such that a metal foil film and a resist film were laminated additionally to a surface of the substrate with electrode opposed to the surface to which the electrodes having a matrix shape were arranged. That is, after the glass epoxy, which was the substrate material, was laminated by the "transfer method" shown in FIG. 8, as shown in FIG. 10, a copper foil as the metal foil film (use was made of fluorine film alternately) was adhered by means of adhesives to a surface of the substrate with electrode opposed to the substrate to which the electrodes having a matrix shape were arranged, under such a state that the glass epoxy (FRP) was half cured, and then a resist film for a corrosion prevention was adhered by means of adhesives thereon. After that, a dummy substrate was peeled off so as to form the substrate with electrode. In the thus formed substrate, a size of respective electrodes arranged in a matrix manner was 300 μm×300 μm, a height (H) of the electrode was 0.2 μm and a gap between adjacent electrodes was 50 μm.

Hereinafter, as is the same as the example 2, the information display panel according to the example 3 was manufactured. The thus manufactured information display panel had an initial contrast ratio and a contrast ratio after endurance as shown in Table 2. In Table 2, data of the example 2, in which the metal foil film and the resist film were not laminated additionally, were also shown. Since, in Table 1 and Table 2, a data measuring condition was varied, the data of the example 2 were also varied in Table 1 and Table 2 on the initial contrast ration and the contrast ratio after endurance.

If the above results were summarized, the followings were understood. As shown in Table 1, the information display panels according to the example 1 and the example 2, in which the particle diameter D of the particle and the height H of the electrode satisfied D≧2H, had a desire excellent contrast ratio after endurance such as the contrast ratio after endurance=10 with respect to the initial contrast ratio=10. The reason for obtaining an excellent contrast ratio after endurance on the information display panel according to the example 1 and the example 2 in this manner can be assumed that a smoothing operation applied to a surface of the substrate by making a thickness of the electrode as thin as possible was contributed. On the other hand, in the information display panel according to the comparative example 1, an extraordinary deterioration of the contrast ratio after endurance such as the contrast ratio after endurance=7 with respect to the initial contrast ratio=10 was detected.

Moreover, as shown in Table 2, the information display panel according to the example 3, in which the metal foil film and the resist film were laminated additionally to the surface of the substrate with electrode opposed to the surface to which the electrodes having a matrix shape were arranged, indicated an extraordinary improvement of the contrast ratio after endurance such as the contrast ratio after endurance=9 with respect to the initial contrast ratio=10, as compared with the information display panel according to the example 2, in which the metal foil film and the resist film were not laminated additionally to the surface of the substrate with electrode opposed to the surface to which the electrodes having a matrix shape were arranged, having the contrast ratio after endurance=1.5. The reason for improving extraordinarily the contrast ratio after endurance on the information display panel according to the example 3 can be assumed that water vapor permeability is remarkably improved from under 0.01 $(g/m^2/day)$ to 50 $(g/m^2/day)$ by additionally laminating the metal foil film and the resist film.

[Estimation of Display Function]

The estimation of display function was based on a contrast ratio (white reflectance/black reflectance) showing a ratio between an image density of white full display and an image density of black full display, which were obtained by changing white full display to black full display or black full display to white full display, and was performed by comparing the initial contrast ratio and the contrast ratio after endurance. In this case, indexes of endurance estimation were as follows. In Table 1, a contrast ratio measured before the endurance test was assumed as the initial contrast ratio, and a contrast ratio after the endurance test, in which 100 V was applied between the electrodes and 100000 times reversing operation was performed, was assumed as the contrast ratio after endurance. In Table 2, a contrast ratio measured before the endurance test was assumed as the initial contrast ratio, and a contrast ratio, which was measured after the manufactured information display panel was maintained for 1000 hours in a humidity oven of 90% RH at 60° C. and then 100 V was applied between the electrodes, was assumed as the contrast ratio after endurance.

In the above measurements, use was made of a portable reflectance densitometer RD 19 (produced by GretagMacbeth AG).

TABLE 1

|  | Example 1 | Example 2 | Comparative example 1 |
| --- | --- | --- | --- |
| Manufacturing method | Thin layer of 10 μm or less is formed by deposition method | Electrode with height of 1 μm or less is formed by transfer method | Formed from known copper adhered lamination plate by etching |
| Electrode material | Aluminum | Nickel | Copper |
| Height of electrode | 3 μm | 0.2 μm | 12 μm |
| Initial contrast ratio | 10 | 10 | 10 |
| Contrast ratio after endurance | 10 | 10 | 7 |

\* Endurance test condition and estimation index: 100 V is applied, and ratio of reflectance between white and black after 100000 times reversing test is measured as contrast ratio.

TABLE 2

|  | Example 3 | Example 2 |
| --- | --- | --- |
| Manufacturing method | 9 μm copper foil is laminated | No lamination |

TABLE 2-continued

| | Example 3 | Example 2 |
|---|---|---|
| Basic construction | Electrode/galss epoxy substrate(FR4)/copper foil(9 μm) | Electrode/glass epoxy substrate (FR4) |
| Water vapor permeability* | 50 g/m²/day | Under 0.01 g/m²/day |
| Initial contrast ratio | 10 | 10 |
| Contrast ratio after endurance | 9 | 1.5 |

*Endurance test condition and estimation index: Maintained for 1000 hrs in humidity oven at 60° C. and 90% RH after panel formation, and ratio of reflectance between white and black when 100 V is applied is assumed to be contrast.

INDUSTRIALLY APPLICABILITY

The information display panel according to the invention does not decrease an image contrast if repeatedly used, and the information display device installing the image display panel mentioned above is applicable to the image display unit for mobile equipment such as notebook personal computers, PDAs, cellular phones, handy-terminal and so on; to the electric paper for electric book, electric newspaper and so on; to the bulletin boards such as signboards, posters, blackboards and so on; to the image display unit for electric calculator, home electric application products, auto supplies and so on; to the card display unit for point card, IC card and so on; and to the display unit for electric advertisement, electric POP, electric price tag, electric bin tag, electric musical score, RF-ID device and so on.

What is claimed is:

1. An information display device which comprises an information display panel, in which at least one group of particles are sealed in a plurality of cells formed by partition walls between the opposed substrates, at least one of two substrates being transparent, and, in which the particles, to which an electrostatic field is applied by utilizing electrodes arranged to the substrates respectively, are made to move so as to display information such as an image, characterized in that, when D is assumed to be a particle diameter of the particles and H is assumed to be a height of the electrodes, the following relation is satisfied: $D \geqq 2H$, and, that a metal foil is laminated to a surface of the substrate opposed to a surface to which the electrode is arranged.

2. An information display device which comprises an information display panel, in which at least one group of liquid powders composed of a solid material stably floating as a dispersant in a gas and exhibiting a high fluidity in an aerosol state are sealed in a plurality of cells formed by partition walls between the opposed substrates, at least one of two substrates being transparent, and, in which the particles, to which an electrostatic field is applied by utilizing electrodes arranged to the substrates respectively, are made to move so as to display information such as an image, characterized in that, when D is assumed to be a particle diameter of particle materials constituting the liquid powders and H is assumed to be a height of the electrodes, the following relation is satisfied: $D \geqq 2H$, and, that a metal foil is laminated to a surface of the substrate opposed to a surface to which the electrode is arranged.

3. The information display device of claim 1, further comprising a resist film which is laminated to the surface of the substrate opposed to the surface to which the electrode is arranged.

4. The information display device of claim 2, further comprising a resist film which is laminated to the surface of the substrate opposed to the surface to which the electrode is arranged.

* * * * *